Figure 1:
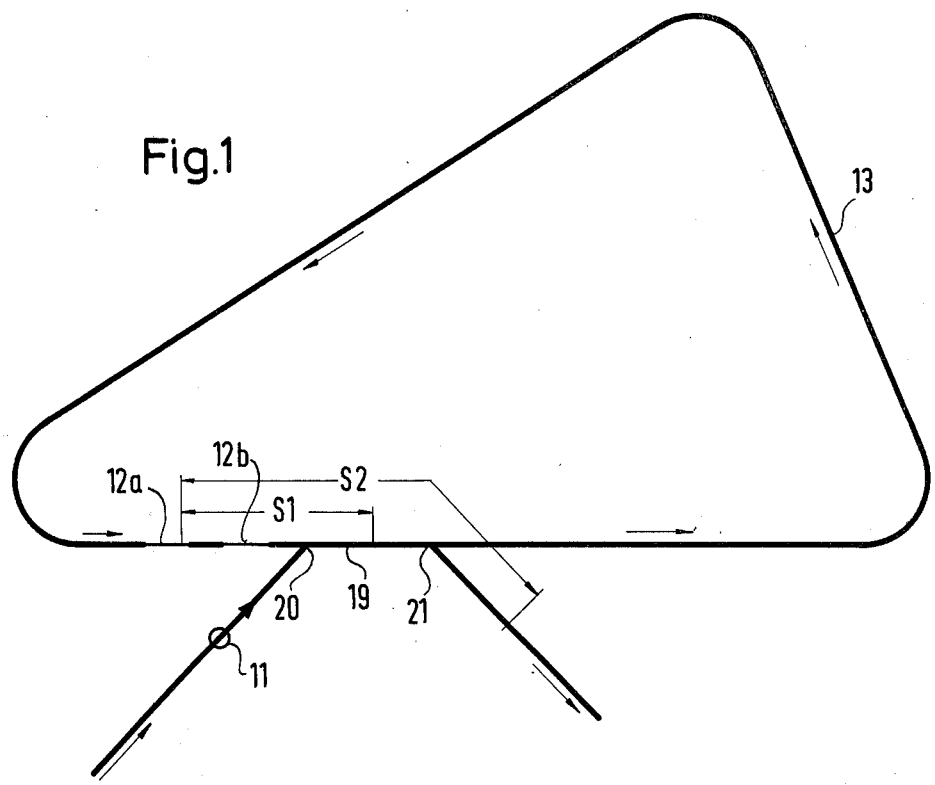

United States Patent

Schlick et al.

[11] 3,995,154
[45] Nov. 30, 1976

[54] CURVE FOLLOWER

[75] Inventors: Aurel Schlick, Germering; Heinz Schreyer, Puchheim, both of Germany

[73] Assignee: Erwin Sick Optik-Elektronik, Waldirch, Germany

[22] Filed: Mar. 26, 1975

[21] Appl. No.: 562,026

[30] Foreign Application Priority Data
Apr. 9, 1974 Germany............................ 2417289

[52] U.S. Cl................................ 250/202; 318/577
[51] Int. Cl.²............................................ G05B 1/00
[58] Field of Search ............ 250/202; 318/162, 567, 318/577; 235/151.1, 151.11

[56] References Cited
UNITED STATES PATENTS

| | | | |
|---|---|---|---|
| 3,496,437 | 2/1970 | Layden................................ | 318/577 |
| 3,597,619 | 8/1971 | Little et al........................... | 250/202 |
| 3,790,788 | 2/1974 | Lister.................................. | 250/202 |
| 3,868,555 | 2/1975 | Knowles............................. | 250/202 |

*Primary Examiner*—David C. Nelms

[57] ABSTRACT

A curve tracer comprising: an optical tracer head for scanning a line having at least a substantial transverse component and at least one marking on the line, with a predetermined scanning speed. The head is moved along the line at a speed substantially lower than the scanning speed. There is a control unit for controlling the movement including an integrator, means for feeding the integrator with a voltage proportional to the speed of the tracer head, and means for supplying a signal proportional to the distance travelled by the tracer head when the head moves over the marking.

20 Claims, 6 Drawing Figures

CURVE FOLLOWER

The invention relates to a curve tracer having an optical tracer head which scans the line followed at least with a substantial transverse component and which is adapted to be moved along the line at a substantially lower speed than the scanning speed and which is connected to a control unit which from the signals supplied by the scanning head forms control signals for the movement of the scanning head along the line, markings on the line being used to trigger additional control commands through the optical tracer head.

Devices of this kind are used for example for scanning curved paths marked on templates and for guiding a tool. The tracer head scans the guide line, which has a constant width, in an e.g. circular movement (German Published Application No. 2,204,118). The centre of the circular path is located on an edge of the line, that is to say the pulses produced when the edge of the line is passed over are used for the control. When scanning is effected in this manner pulses occur for example at 0° and 180° and are evaluated in a suitable electronic circuit arrangement so that in the event of the desired arrangement of the circular scanning line deviating in relation to the line which is to be followed coordinate motors in the tracer head or in the guided tool are controlled in such a manner that any incorrect alignment detected is corrected.

The scanning curve of the tracer head need not necessarily be circular. On the other hand it is essential that during the scanning there should be a substantial scanning component transversely to the line which is to be followed. The line is preferably followed exactly in the transverse direction, which is likewise achieved with the known circular scanning.

A problem in curve tracers of this kind consists in that, for example when tracing contour lines, certain regions of the contour must be travelled over a plurality of times because of the inlet and exit, so that in this region it is not possible to provide for the initiation of a control operation any markings which relate to a deviation to one side or the other at the end of the region in question.

The invention therefore seeks to solve the problem of disposing control instructions, for the deviation of the tracer head, at a branch point disposed upstream of the portion of the path which is travelled over a plurality of times, while it should be ensured that the necessary control instructions are given at a suitable point with great accuracy and without the risk of errors.

In order to solve this problem, according to the invention an integrator is provided which is fed with a voltage proportional to the speed of the tracer head and which starting from the occurrence of a marking on the line in the region of the tracer head supplies a signal which is proportional to the path travelled and in dependance on which the further control instructions are given. The basic principle of the invention therefore consists in that upstream of a section which is travelled over a plurality of times code markings are provided on a section of the contoured line which is travelled over by the tracer head only once, the code marks operating the integrator which thereupon after a predetermined distance has been travelled (and not after a predetermined period of time) issues control instructions such as "turn off right", "turn off left", "center", or "brake". As the result of this solution any fluctuations of speed in the advance of the tracer head of the tool, for example, no longer have any influence on the accuracy of the point at which the control instruction is issued. For example, the tracer head and the tool can even be temporarily halted without the automatic control system being affected. A stoppage of this kind may for example be necessary if there should be some slight trouble with the tool. After the trouble has been put right the operator need only switch on the automatic tracing operation once more and the operation will proceed in the same way without any risk of errors resulting therefrom.

It is particularly advantageous for the marking provided on the contour line to be a narrowing of the line. In comparison with a lateral mark on the contour line (German Published Application No. 2,204,118) this arrangement has the advantage that the code marking can also be used if the contour line contains branches which in accordance with a determined control programme are also to be followed. If in fact the code marking is in the form of marks standing off to one side, a control signal will also be incorrectly given when the tracer head moves over a branch of the contour line. Since however the invention preferably works with a narrowed line, when the tracer head travels over a branch it is no longer possible for an incorrect control signal to be given. From the point of view of the tracer head the branch in fact corresponds to a temporary thickening of the line, whereas the control signals are initiated only when the line narrows.

In comparison with the speed of advance of the tracer head the narrowed line is advantageously of such a length that a plurality of scannings take place during movement along the narrowed line. In this manner it is ensured that the narrowing of the line is reliably detected.

In order to enable a large number of different control instructions to be detected, it is convenient for a code marking to comprise a plurality of serially disposed narrowed portions of the lines, while a maximum of four narrowed portions should be provided for one code marking. Four different control instructions can thus be accommodated.

The distance between two narrowed portions of the line belonging to the one code marking is expediently equal to the length of one narrowed portion of the line. In this manner the device can effectively distinguish between the different successive narrowed portions of the line and the code markings are accommodated within an acceptable space along the length of the contour line.

A particularly advantageous practical embodiment is characterised in that there is connected to the integrator a first comparator at whose other input a first predeterminable path signal is applied and whose output is connected to an evaluating unit which in dependance on the code marking provided on the line transmits a control signal as soon as the prescribed distance has been travelled. The evaluating unit is preferably connected to a counter which counts the narrowed portions of the line and thus adjusts the evaluating unit in accordance with the code marking given by the number of narrowed portions on the line, so that the evaluating unit transmits the control signal corresponding to the code marking on the occurrence of the first path signal. The counter thus evaluates the code markings contained in the narrowed portions of the line and controls the evaluating unit accordingly. At this point it may be added that the code markings must be accommodated exclusively on sections of the contour line which are travelled over only once by the tracer head. Since on the other hand the control instructions should preferably be given on sections of the line which are travelled over by the tracer head more than once, the path signals fed into the comparator are always longer than the distance on which the code marking consisting of a plurality of narrowed portions on the line is accommodated.

It is expedient to connect to the integrator a second comparator at whose other input a second predeterminable path distance is applied and whose output is connected to the reset input of the counter. The second path which can be predetermined in the second comparator is therefore longer than the path determined by the first comparator. The second path signal resets the counter to zero after expiry of a control period and also resets the evaluating unit for the reception of the next coding.

The counter is expediently controlled by pulses allocated to each narrowed portion of the line. This means that when the tracer head passes over the narrowed portions of the line the counter is each time advanced by one unit. In an advantageous embodiment the scanning pulses are fed, optionally after inversion, to a band-pass filter whose output is used to form the counter control pulses. The band-pass filter advantageously consists of a low-pass filter followed by a high-pass filter. The band-pass filter forms the arithmetic mean of the pulses received. The high-pass filter suppresses the absolute value (equal component), so that only the alterations pass through. The time constant of the high-pass filter must be greater than or equal to the time required by the tracer head to move along a narrowed portion of the line.

The band-pass filter is expediently connected to a comparator to whose other input a threshold voltage is fed. This measure serves firstly to form a clean rectangular pass, and secondly to make it impossible for the counter to be triggered by slight defects in the contour line, dirt, or the like. By adjusting a suitable threshold height it can be ensured that triggering is effected only when the contour line actually contains a drawn narrowed portion of line. The threshold voltage is naturally lower than the height of the pulse allowed through by the band-pass filter when a narrowed portion of line is scanned.

In another advantageous embodiment the output of the comparator is connected to the tripping input of another integrator, which likewise receives a voltage proportional to the speed of the tracer head and whose output is fed to another comparator whose other input receives a threshold voltage, while its output controls the counter. As the result of this advantageous arrangement the pulse length is also checked, because if the pulse is not of the necessary length the increasing voltage produced at the output of the integrator is not sufficient to overcome the additional threshold voltage. According to the invention therefore the pulse length is also automatically checked. This is therefore a coding mark testing circuit. When a pulse length check is made the marking may also be disposed in a thickened portion of the line, since through the selection of a suitable marking length a distinction can immediately be made from the smaller width of any branches or crossings.

The rectangular pulse finally formed at the output of the additional comparator is evaluated in the counter in such a manner that only its rear flank is utilised for tripping. In this way the length of the pulse finally formed has no influence on the accuracy of measurement.

Figure 2:
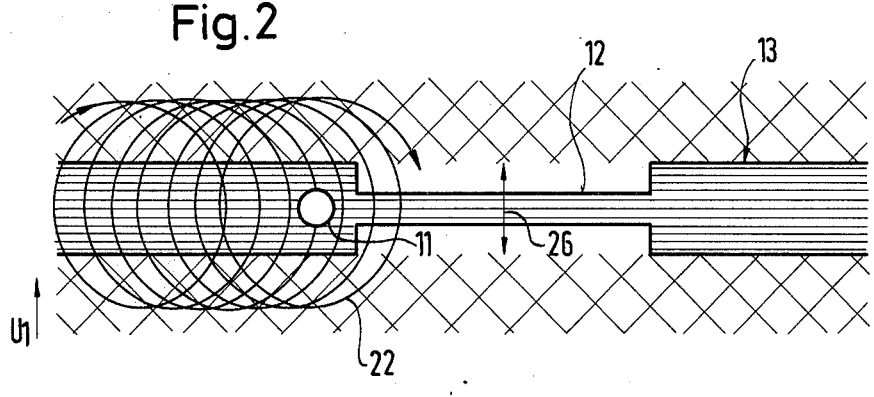
Figure 3:
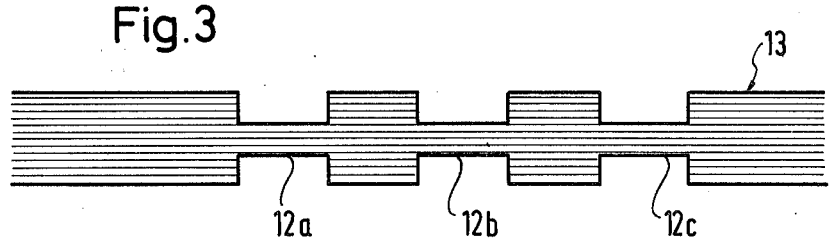
Figure 4:
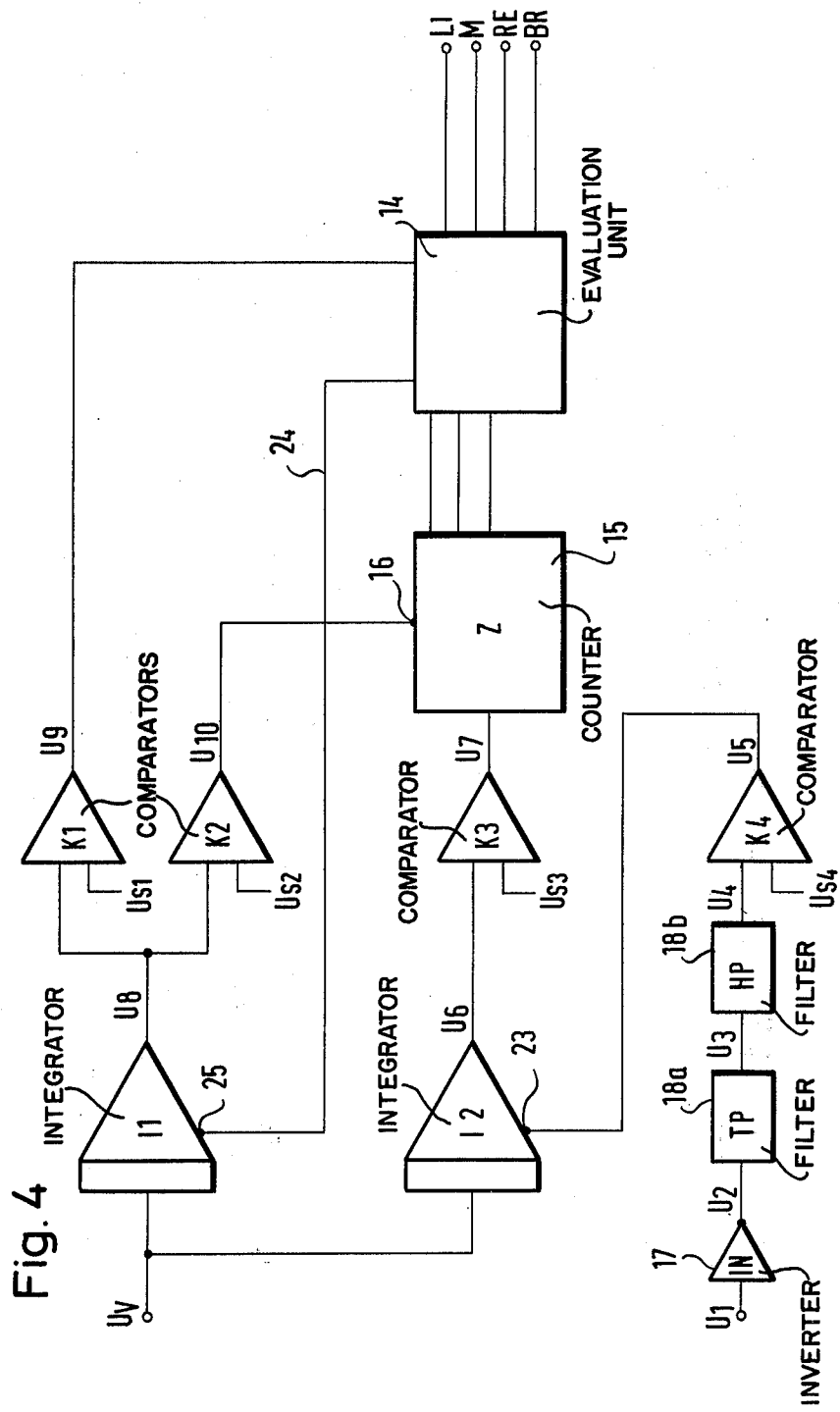
Figure 5:
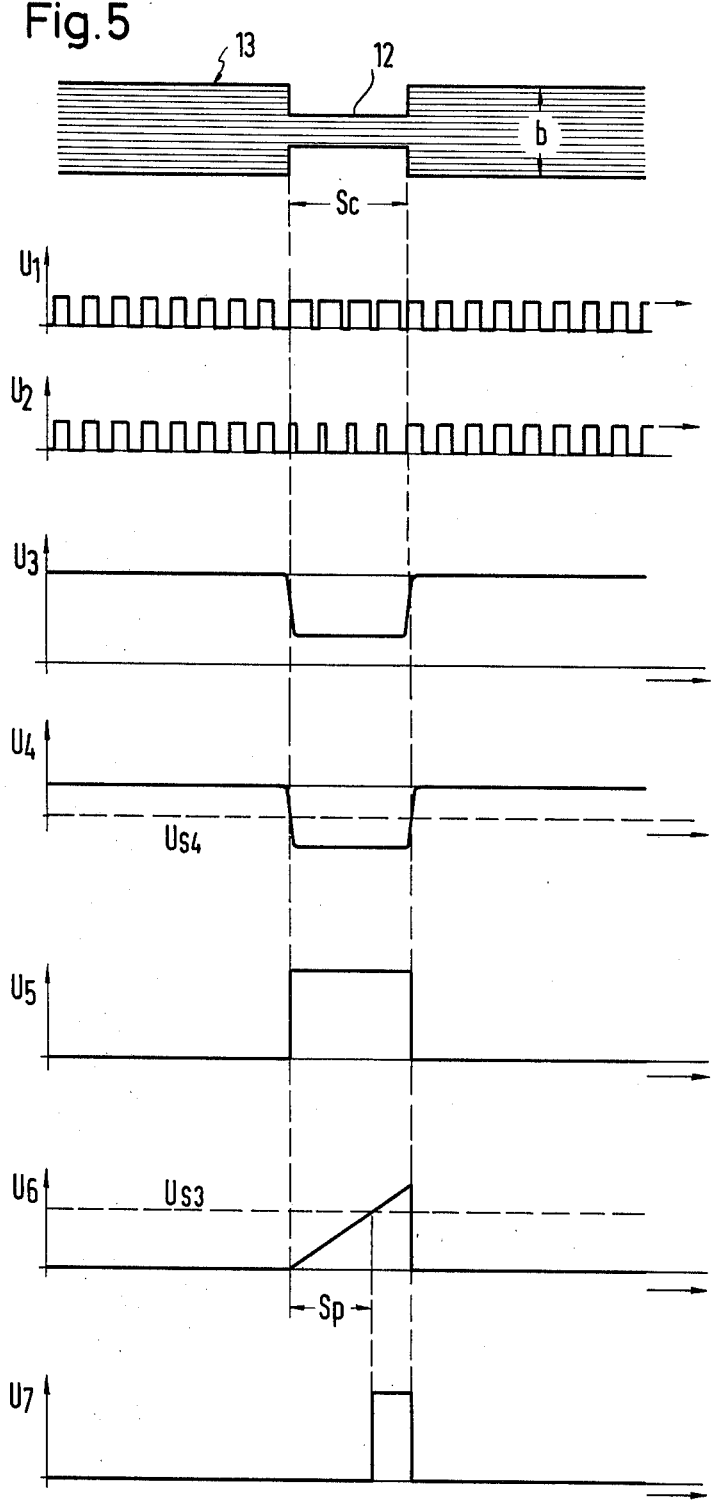
Figure 6:
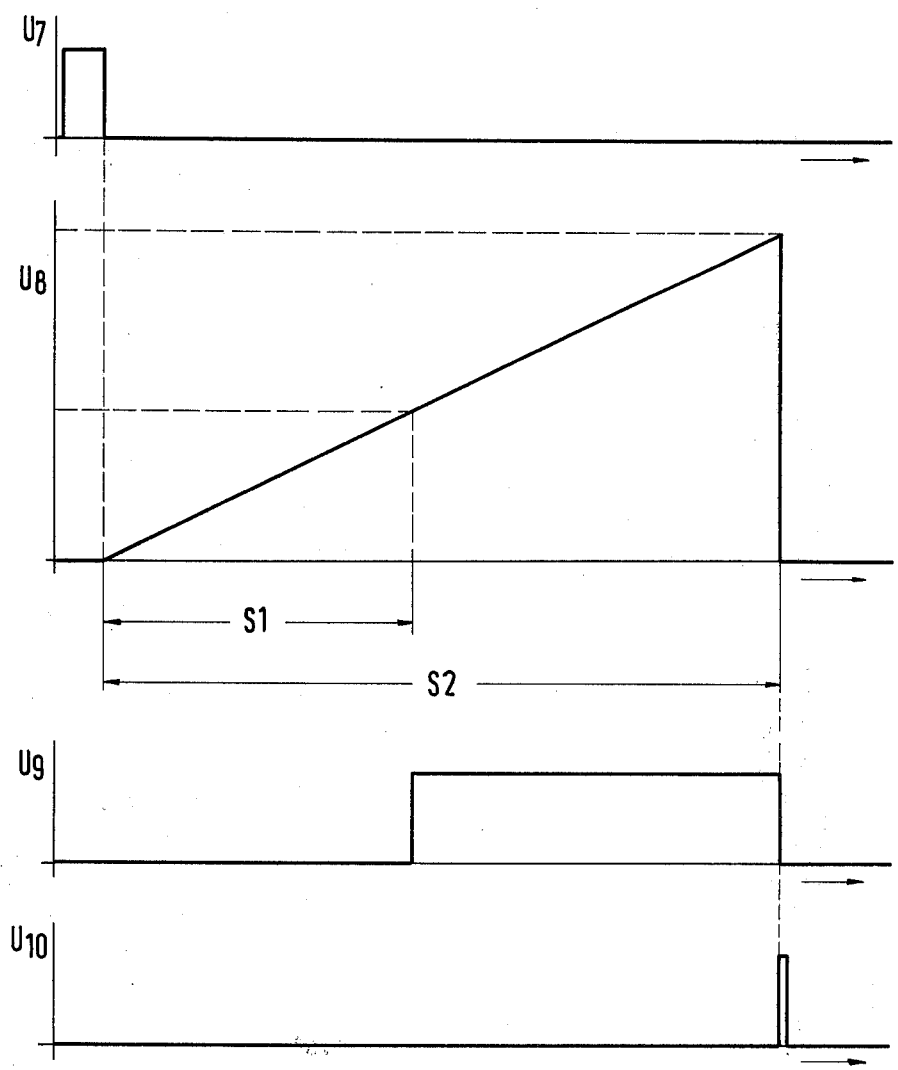

The invention is described below by way of example and with reference to the drawing, in which:

FIG. 1 is a plan view of a contour line with entry and exit, wherein the curve tracer of the invention is utilised with particular advantage, FIG. 2 is a plan view on a larger scale of the contour line which is to be traced, the scanning path of the optical tracer head being indicated diagramatically, FIG. 3 is a plan view similar to FIG. 2 and shows a contour line having a plurality of narrowed portions of the line belonging to a code marking, FIG. 4 is a block circuit diagram of the essential components of the curved tracer of the invention, FIG. 5 is a pulse diagram of the circuit shown in FIG. 4 during the scanning of a narrowed portion of line, and FIG. 6, a pulse diagram of the circuit shown in FIG. 4 after the scanning of a code marking on the contour line.

According to FIG. 1, a diagramatically indicated tracer head 11 is to enter a contour line 13, which is to be traced, at an entry point 20 in the manner indicated by an arrow. During the scanning of the contour line 13 a tool guided parallel is, for example, to machine a workpiece. After one circuit of the contour line 13 the tracer head 11 then again passes over the common portion 19 and should then branch off to the right at the point 21, whereupon for example it moves to another contour line which is to be scanned.

In order to prevent the tracer head 11 from producing a control signal as it passes over the entry point 20 and exit point 21, the control code markings are not the known marks standing off laterally from the contour line 13, but are in the form of narrowed portions 12 of the line which can be seen particularly clearly in FIG. 2. Just as the contour line 13 has a constant width, the narrowed portion 12 of the line also has a uniform width. The tracer head 11 scans the contour line 13 along the diagramatically indicated curve 22, that is to say scanning is effected on circular paths while at the same time a certain advance is made in the longitudinal direction of the line 13. The tracer head 11 is indicated only diagramatically in FIG. 2.

The pulse train produced at the output of the pulse head 11 is reproduced in the first diagram in FIG. 5. This relates to the pulse voltage U1.

As can be seen from the pulse diagram U1, assuming a black line on a white ground there are formed at regular intervals downward-going pulses whose width corresponds to the width of the line. These pulses become narrower when scanning is effected in the region of the narrowed portion 12 of the line.

It should be pointed out that scanning is effected by means of either the front or the rear scanning section of the circular scanning path. Similarly, linear scanning to-and-fro in the transverse direction is also conceivable, for example by means of an oscillating mirror.

According to FIG. 4, the pulses U1 coming from the tracer head are first pulsed to an inverter 17, which forms therefrom the pulse train with positive-going pulses U2 which can be seen in FIG. 5. These pulses are fed to a band-pass filter which consists of a low-pass filter 18a and a high-pass filter 18b and whose output voltages U3, U4 are likewise shown diagramatically in FIG. 5. The time constant of the low-pass filter 18a must be made sufficiently long to enable a pulse form as shown in FIG. 5 to be obtained.

According to FIG. 4, the voltage U4 is applied to a comparator K4 to which a threshold voltage US4 is fed the height of which in relation to the output voltage of the band-pass filter 18a, 18b can be seen approximately in FIG. 5. At the output of the comparator K4 a rectangular pulse according to the pulse diagram U5 in FIG. 5 accordingly appears when a narrowed portion 12 of the line is passed over.

The output of the comparator K4 is connected to the tripping input 23 of an integrator 12 whose input voltage is proportional to the rate of advance of the tracer head 11. On the appearance of the rectangular pulse U5 at the output of the comparator K4, the integrator 12 starts to integrate the input voltage with the output voltage U6 in accordance with the pulse diagram U6 in FIG. 5. The output of the integrator 12 is then fed to another comparator K3, to whose other input another threshold voltage US3 is fed the magnitude of which in relation to U6 can be seen approximately in FIG. 5. Only when the voltage U6 transmitted by the integrator 12 exceeds the threshold US3 is a rectangular pulse U7 formed at the output of the comparator K3, this rectangular pulse being recorded by a connected counter 15.

The counter 15 is connected to an evaluation unit 14 which can be adjusted to different possible control commands, for example left (Li), centre (M), right (Re), or braking (Br), depending on the number of pulses U7 counted. In the example illustrated in FIG. 4 a counter counts up to four and accordingly permits four different control commands in the evaluation unit 14.

Furthermore, the evaluation unit 14 is connected by a line 24 to the tripping input 25 of another integrator I1, which is likewise fed with the voltage proportional to the speed of advance of the tracer head 11.

As soon as the counter 15 has counted a pulse U7 and has transmitted this in the manner described to the evaluation unit 14, the integrator I1 is triggered by means of the line 24, that is to say it begins to integrate the speed signal produced at its input. The output voltage of the indicator I1 is shown in FIG. 6 as U8. It represents the distance travelled by the tracer head 11 since the occurrence of the pulse U7.

It should here be particularly pointed out that the integrator I1 is on each occasion triggered by the first pulse U7 of a coding represented by one or more narrowed portions 12 of the line. If a coding is accommodated for example in three successive narrowed line portions 12a, 12b, 12c as shown in FIG. 3, the integrator I1 is already running when the codings 12b and 12c produce further pulses U7. These pulses then serve solely to advance the counter 15 by one unit at a time, and thus to adjust the desired control signal in the evaluation unit 14.

The output voltage U8 of the integrator I1 is now fed in accordance with FIG. 4 to two comparators K1, K2, whose other inputs receive distance signals US1 and US2 respectively. US1 and US2 are signals which are representative of the distances S1 and S2 indicated in FIGS. 1 and 6.

The voltage US1 corresponds to a distance S1 which extends from the first narrowed line portion 12a to the region 19 over which the tracer head 11 passes twice. S2 is a longer distance ending at a point (after the branch 21 in FIG. 1) where all the control operations have been completed and the entire arrangement comprising the counter 15 and the evaluation unit 14 are to be reset to the starting point.

According to FIG. 6 an output pulse U9 occurs at the output of the comparator K1 when the output voltage of the integrator I1 has reached the value of US1. This output signal U9 is also fed to the evaluation unit 14.

Since the distance S1 is longer than the distance along which the entire coding is accommodated, the necessary control signal has already been prepared in the evaluation unit 14 before the pulse U9 appears at the evaluation unit 14. At this moment the necessary signal is triggered at the output of the evaluation unit 14 and appears at the output of the evaluation unit 14. In the example shown in FIG. 1, at the end of the distance S1 the signal "turn right" would therefore appear at the output of the evaluation unit 14, so that the tracer head would turn to the right at the branch point 21.

In order now to switch the device back to the starting point after performance of the desired control, the comparator K2 supplies an output signal U10 (FIG. 6) to the reset input 16 of the counter 15 because of the higher path voltage US2. The higher path voltage US2 is so selected that the resetting takes place only after the control instructed at the end of S1.

The curved tracer of the invention works in the following manner:

According to FIG. 1, the contour line 13 to be followed is drawn on a sheet of paper or other base, the desired code markings preceding the branch 20 being taken into account in the form of a suitable number of serially disposed narrowed line portions 12a, 12b.

The path voltages US1 and US2 at the comparators K1 and K2 are now preset in accordance with the desired paths S1 and S2 shown in FIG. 1. The other threshold voltages US3 and US4 in the comparators K3 and K4 are preset in accordance with the maximum defects to be expected as the result of dirt, poor drawing, and so on.

The tracer head 11 is now for example brought into the position shown in FIG. 1, and the advance of the tracer head 11 is started.

As soon as the tracer head 11 has travelled around the contour line 13 and reached the first narrowed line portions 12a, the evaluation unit 14 is activated by means of the pulse U7 with the aid of the counter 15 and in turn operates the integrator I1 by way of the line 24. The integrator I1 now starts to integrate the speed signal and to deliver the voltage U8 (FIG. 6). When the second narrowed line portion 12b is passed over the counter is moved on by one more unit, and in the evaluation unit 14 the control signal "turn right" is prepared.

As soon as the tracer head 11 has passed over the path S1, there appears at the output of the comparator K1 a pulse signal which now causes the control signal prepared in the evaluation unit 14 to appear at the output of the latter. For this reason the tracer head 11 turns right at the branch point 21. As soon as the path S2 has then been covered, the disconnection signal U10 appears at the output of the comparator K2 and sets the evaluation unit 14 back to the starting point.

As can be seen particularly clearly in FIG. 1, the "turn right" signal is given before the branch point 21 is reached. At the end of the path S1 the tracer head is therefore first brought into a position of readiness for turning off. According to the invention this is preferably achieved by widening the scanning field 26 of the tracer head 11 by a predetermined amount in the direction of the turn-off side, this scanning field normally being adjusted to the width of the line 13. The narrowing or widening of the scanning field 26 can be achieved by means of an adjustable mechanical mask, but is preferably achieved by electronic means.

At the end of the path S1 the scanning field 26, which hitherto had only the same width as the line 13, has therefore been widened towards the right. On reaching the branch point 21 the scanning head 11 can in this way detect the line branching off to the right and follow it with the aid of a suitable electronic circuit. At the end of the path S2 the scanning field 26 is then set back again to the line width 13, so that a new cycle can now begin.

It should also be pointed out that when the scanning field 26 is adjusted to the width of the contour line the control slope falls to half, but this can be accepted without difficulty. If however a higher degree of tracing accuracy should be desired, the scanning field 26 can be widened towards both sides beyond the width of the line along a determined distance containing no branches. This can be done, for example, along the relatively long loop of the contour line in FIG. 1 where there are no branches. On the appearance of the first narrowed line portion 12a, however, a signal which narrows the scanning field 26 to the width of the line 13 is then at first produced immediately. It is thereby ensured that when the branching point 20 is reached there is no danger of the tracer head 11 turning to the right. When the tracer head 11 runs in through the branching points 20, 21 the scanning field must also be reduced to the width of the line in order to ensure perfect passage through these branching points.

The left-hand signal Li at the output of the evaluation unit 14 thus brings about an opening of the scanning field 26 towards the left, while the right-hand signal Re brings about a corresponding opening of the scanning field 26 to the right. In this manner the tracer head is brought into a position of readiness for a left-hand or right-hand turn, so that at the next crossing or branching point a corresponding turn-off is made. On the occurrence of the signal M (centre), on the other hand, the narrowing of the scanning field 26 to the width of the line is retained, so that when a crossing then occurs the tracer head continues straight ahead.

We claim:

1. A curve tracer comprising: an optical tracer head for scanning a line having at least a substantial transverse component and at least one marking on the line, with a predetermined scanning speed, means for moving said head along said line at a speed substantially lower than said scanning speed, and a control unit comprising an integrator, means connected to said integrator for feeding said integrator with a voltage proportional to the speed of said tracer head, and means connected to said control unit for supplying a signal proportional to the distance travelled by said tracer head when said head moves over said marking.

2. A tracer according to claim 1, wherein the marking comprises a narrowed portion of the line.

3. A tracer according to claim 2, wherein the narrowed portion of the line is of such a length in relation to the speed of advance of the tracer head that a plurality of scannings are effected during passage over the narrowed portion of the line.

4. A tracer according to claim 2, wherein said line comprises a coding in a plurality of serially disposed line portions which are narrower than said line.

5. A tracer according to claim 4, wherein a maximum of four said narrow line portions are provided.

6. A tracer according to claim 4, wherein the distance between two narrow line portions belonging to a coding is equal to the length of a narrow line portion.

7. A tracer according to claim 4, comprising a first comparator connected to said integrator, and having an input for receiving a first predeterminable path signal and an output, an evaluating unit connected to said output, said evaluating unit, depending on the coding on the line being adapted to transmit a control signal as soon as the predetermined length of path has been passed.

8. A tracer according to claim 7, comprising a counter connected to said evaluating unit, said counter being adapted to count the narrow line portions to thereby adjust said evaluating unit in accordance with the coding given by the number of narrow line portions, so that on the occurrence of the first path signal the evaluating unit transmits said control signal.

9. A tracer according to claim 8, comprising a second comparator connected to said integrator, said counter having a reset input, said second comparator having an input for receiving a second predeterminable path signal and an output connected to said reset input of said counter.

10. A tracer according to claim 9, wherein said counter has means for receiving pulses associated with a narrowed line portion.

11. A tracer according to claim 10, comprising a band-pass filter having an input for receiving said second path signal and having an output for forming said pulses received by said counter.

12. A tracer according to claim 11, wherein said band-pass filter comprises a low-pass filter followed by a high-pass filter.

13. A tracer according to claim 11, comprising a third comparator connected to said band-pass filter, said filter having an input for receiving a threshold voltage.

14. A tracer according to claim 13, comprising a second integrator with a tripping input connected to the output of said third comparator, means for feeding a voltage proportional to the speed of said tracer head to said second integrator, said second integrator having an output connected to a fourth comparator whose input is fed with a threshold voltage and whose output is connected to said counter.

15. A tracer according to claim 1, wherein said line has a branching line, and wherein said markings are thick line portions, the length of each thick line portion being substantially greater than the width of said branching line.

16. A tracer according to claim 1, wherein said line has a crossing line, and wherein said markings are thick line portions, the length of each thick line portion being substantially greater than the width of said crossing line.

17. A tracer according to claim 1, comprising means for adjusting the width of the scanning field of the tracer head.

18. A tracer according to claim 17, wherein said adjusting means is a mechanical mask.

19. A tracer according to claim 17, wherein said adjusting means is an electronic means.

20. A tracer according to claim 17, wherein the width of the scanning field is normally adjusted to the width of the line by said adjusting means, and means for generating a right hand signal for widening the line to the right and for generating a left hand signal for widening the line to the left.

* * * * *